United States Patent
Harris et al.

(10) Patent No.: US 6,704,412 B1
(45) Date of Patent: Mar. 9, 2004

(54) SYSTEMS CONFIGURED TO DISTRIBUTE A TELEPHONE CALL, COMMUNICATION SYSTEMS, COMMUNICATION METHODS AND METHODS OF ROUTING A TELEPHONE CALL TO A SERVICE REPRESENTATIVE

(75) Inventors: Scott H. Harris, Idaho Falls, ID (US); Joel A. Johnson, Rigby, ID (US); Jeffery R. Neiswanger, Idaho Falls, ID (US); Kevin E. Twitchell, Idaho Falls, ID (US)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 0 days.

(21) Appl. No.: 09/160,632

(22) Filed: Sep. 24, 1998

(51) Int. Cl.⁷ .......................... H04M 3/00; H04M 5/00; H04M 3/42; H04L 12/66
(52) U.S. Cl. ............. 379/269; 379/211.01; 379/212.01; 370/352; 370/276
(58) Field of Search ........................ 379/265, 211–212, 379/260; 370/276, 352

(56) References Cited

U.S. PATENT DOCUMENTS

| | | | |
|---|---|---|---|
| 5,073,890 A | * 12/1991 | Danielsen | 370/58.2 |
| 5,206,903 A | 4/1993 | Kohler et al. | 379/309 |
| 5,214,650 A | 5/1993 | Renner et al. | 370/110.1 |
| 5,276,732 A | 1/1994 | Stent et al. | 379/93 |
| 5,291,492 A | 3/1994 | Andrews et al. | 370/110.1 |
| 5,291,551 A | 3/1994 | Conn et al. | 379/265 |
| 5,333,133 A | 7/1994 | Andrews et al. | 370/58.2 |
| 5,341,374 A | 8/1994 | Lewen et al. | 370/85.4 |
| 5,434,906 A | * 7/1995 | Robinson et al. | 379/67 |
| 5,463,616 A | 10/1995 | Kruse et al. | 370/24 |
| 5,469,504 A | * 11/1995 | Blaha | 379/265.02 |
| 5,521,966 A | * 5/1996 | Friedes et al. | 379/91.02 |
| 5,608,786 A | * 3/1997 | Gordon | 379/100 |
| 5,619,557 A | 4/1997 | Van Berkum | 379/88 |
| 5,625,677 A | 4/1997 | Feiertag et al. | 379/93 |
| 5,684,870 A | 11/1997 | Maloney et al. | 379/212 |
| 5,764,639 A | 6/1998 | Staples et al. | 370/401 |
| 5,778,060 A | 7/1998 | Otto | |
| 5,805,587 A | * 9/1998 | Norris et al. | 370/352 |
| 5,884,032 A | * 3/1999 | Bateman et al. | 395/200.34 |
| 5,889,845 A | * 3/1999 | Staples et al. | 379/211 |
| 5,915,010 A | * 6/1999 | McCalmont | 379/212.01 |
| 5,923,745 A | * 7/1999 | Hurd | 379/220.01 |
| 5,937,051 A | * 8/1999 | Hurd et al. | 379/212.01 |
| 5,940,497 A | * 8/1999 | Miloslavsky | 379/265.11 |
| 6,046,762 A | * 4/2000 | Sonesh et al. | 348/16 |
| 6,058,163 A | * 5/2000 | Pattison et al. | 379/34 |
| 6,175,563 B1 | * 1/2001 | Miloslavsky | 370/352 |
| 6,289,094 B1 | * 9/2001 | Miloslavsky | 379/220.01 |
| 6,311,231 B1 | * 10/2001 | Bateman et al. | 710/5 |
| 6,393,018 B2 | * 5/2002 | Miloslavsky | 370/352 |

OTHER PUBLICATIONS

D/240SC–TI™ 24–Port Voice Processing & T–1 ISDN PRI Board, Dialogic Voice Products, pp. 6.84–6.88.

* cited by examiner

Primary Examiner—Harry S. Hong
Assistant Examiner—Thjuan P. Knowlin
(74) Attorney, Agent, or Firm—Wells St. John Roberts; Gregory & Matkin

(57) ABSTRACT

The present invention includes systems configured to distribute a telephone call, communication systems, communication methods and methods of routing a telephone call to a customer service representative. In one embodiment of the invention, a system configured to distribute a telephone call within a network includes a distributor adapted to connect with a telephone system, the distributor being configured to connect a telephone call using the telephone system and output the telephone call and associated data of the telephone call; and a plurality of customer service representative terminals connected with the distributor and a selected customer service representative terminal being configured to receive the telephone call and the associated data, the distributor and the selected customer service representative terminal being configured to synchronize, application of the telephone call and associated data from the distributor to the selected customer service representative terminal.

54 Claims, 13 Drawing Sheets

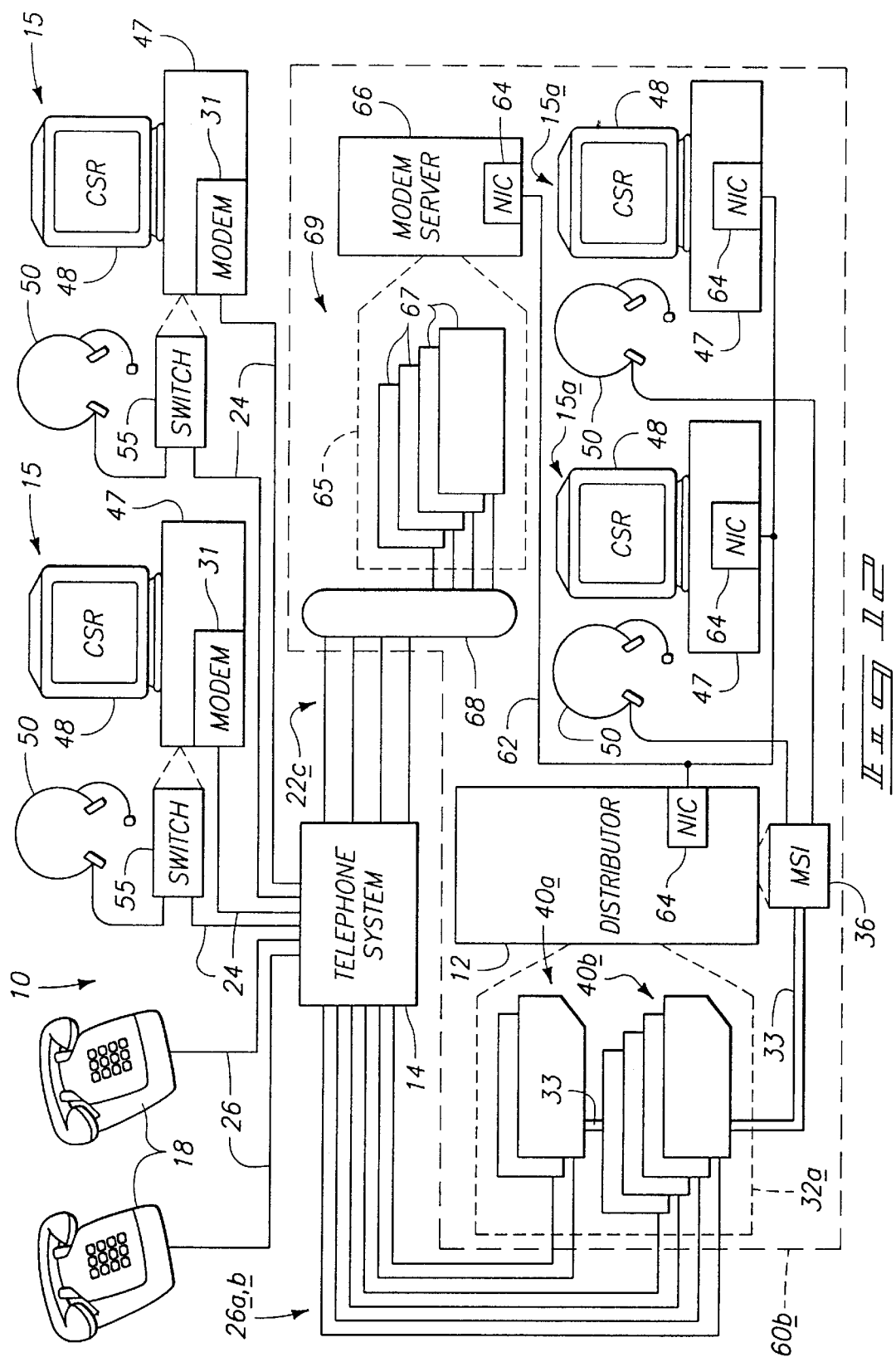

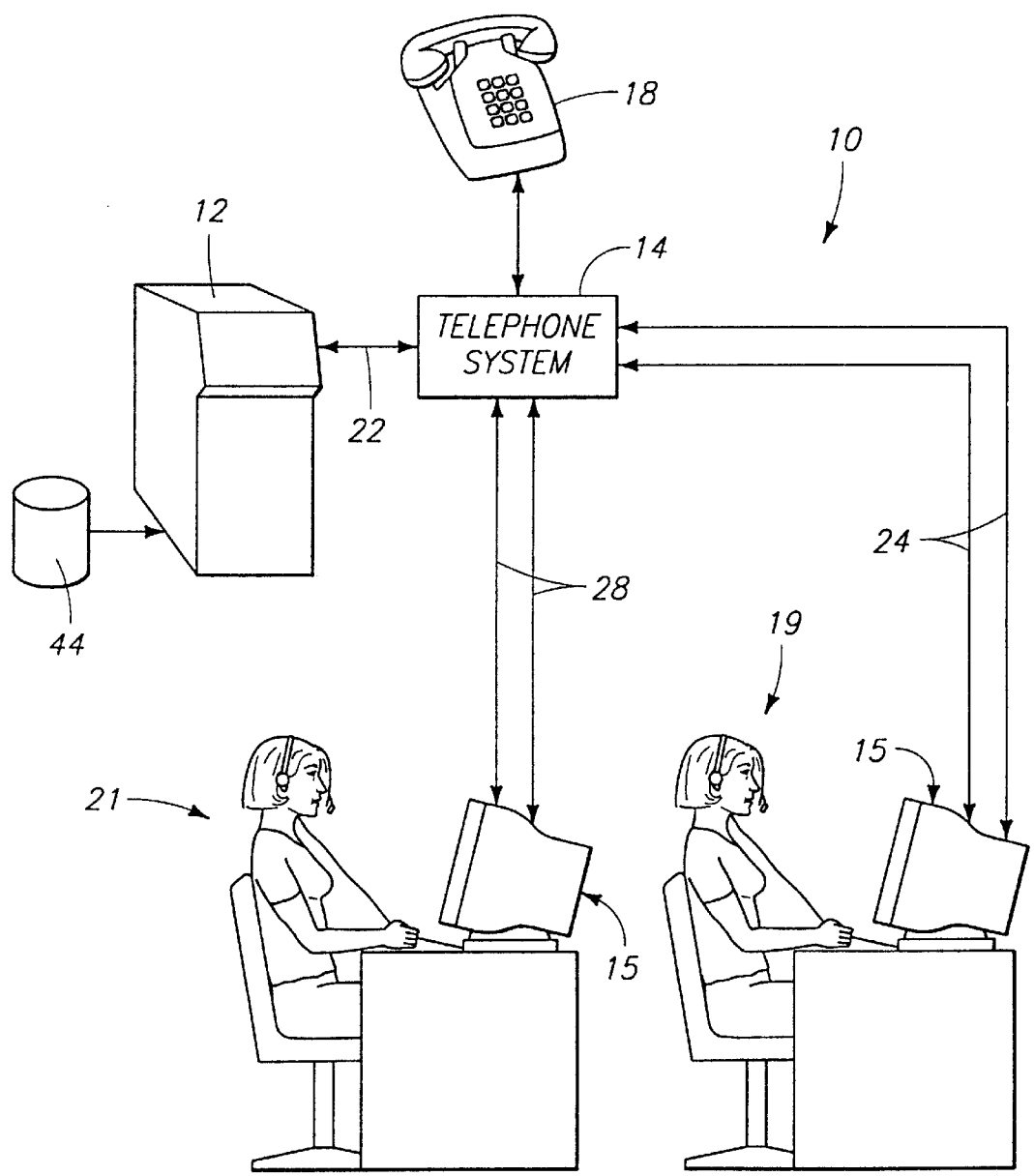

SYSTEMS CONFIGURED TO DISTRIBUTE A TELEPHONE CALL, COMMUNICATION SYSTEMS, COMMUNICATION METHODS AND METHODS OF ROUTING A TELEPHONE CALL TO A SERVICE REPRESENTATIVE

TECHNICAL FIELD

The present invention relates to systems configured to distribute a telephone call, communication systems, communication methods and methods of routing a telephone call to a customer service representative.

BACKGROUND OF THE INVENTION

Numerous applications exist where it is desired to provide communication from an inbound caller to one or more of a is plurality of terminals. The terminals can be remotely located over a wide geographical area.

In one example, a distributed workforce for handling customer relations, in a business application is provided to attend to telephone calls received from customers. Typical customer relations inquiries include requests of product information, questions regarding purchased products, applications of products, or an endless number of reasons to communicate with someone within the company.

Voice response units are currently utilized to help with the distribution of calls and in many instances can take care of or resolve most customer needs without requiring the services of a customer service representative. In other instances however, it is necessary for the customer to speak with a customer service representative. Inasmuch as the company may offer many products, the customer service representatives are often divided into specialties having familiarity or expertise with a particular area, technology or product.

In common situations, the body of customer service representatives is distributed across a plurality of geographical areas, or within different buildings proximately located in one area. Providing connectivity amongst the customer service representatives and a central telephone call distribution unit is desirable for ease of use by the customer. In particular, such connectivity reduces the need for the customer to place numerous calls for connection to the appropriate customer service representative.

Numerous devices exist for improving telecommunications within a distributed network. An exemplary control system for processing calls includes a call handling device and a device controller as described in U.S. Pat. No. 5,333, 133, incorporated herein by reference. In addition, other improvements increase the flow of data through existing equipment. For example, U.S. Pat. No. 5,625,677, incorporated herein by reference, discloses a simultaneous voice and data communications device providing simultaneous voice/data communications over a single "plain old telephone service" (POTS) connection.

Despite these developments, there exists a need to improve interfacing of voice and data communications between users within a distributed network and outside individuals or customers.

BRIEF DESCRIPTION OF THE DRAWINGS

Preferred embodiments of the invention are described below with reference to the following accompanying drawings.

FIG. 12 is a schematic diagram corresponding to another embodiment of the distributed network of FIG. 10.

FIG. 13 is an illustrative representation of forwarding existing data and voice communications between plural terminals.

DETAILED DESCRIPTION OF THE PREFERRED EMBODIMENTS

Figure 1:
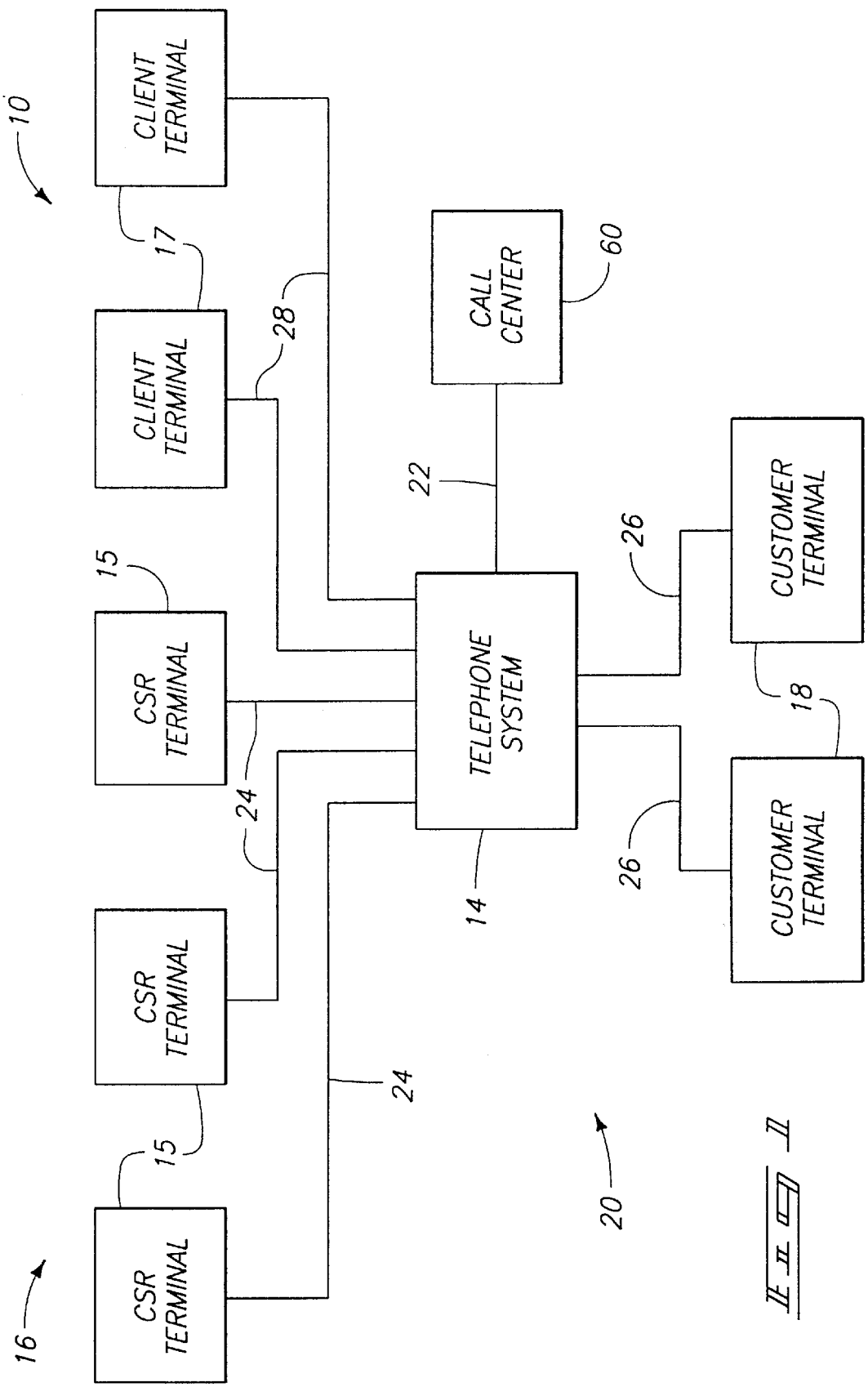
FIG. 1 is a functional block diagram of a distributed network of the present invention.

This disclosure of the invention is submitted in furtherance of the constitutional purposes of the U.S. Patent Laws "to promote the progress of science and useful arts" (Article 1, Section 8).

The present invention includes distributed network systems which provide location independence for a distributed workforce such as customer service representatives. In particular, the disclosed distributed network systems enable data and voice communications between outside parties and members of a workforce located in different geographical regions.

Further, the distributed network systems of the present invention preferably provide associated data or information regarding an individual placing an inbound communication or an individual receiving an outbound call. The systems of the present invention are configured to connect with inbound calls in some embodiments. The systems provide associated data corresponding to the caller of the inbound communication in such embodiments. In another embodiment, the distributed network systems are configured to place or connect an outbound call. Once an outbound call is connected, data regarding the telephone number or individual called is forwarded to a customer service representative who processes the call.

The associated data can comprise identification information such as the name and address of the caller, or other information such as information regarding the specific nature of the telephone call itself. Such associated data or information is preferably available to a customer service representative (CSR) addressing the communication to enhance the assisting of the individual or customer by the customer service representative. The distributed network system is configured to direct inbound or outbound communications to a selected customer service representative responsive to the associated data in one embodiment.

Preferred embodiments of the distributed network systems according to the present invention are configured to apply the associated data to a terminal of the customer service representative prior to establishing voice communications between the individual placing or receiving the communication and the customer service representative. The customer service representative is knowledgeable of the associated data prior to beginning a conversation with the caller.

According to one embodiment, the present invention provides a system configured to distribute a telephone call within a network, the system comprises: a distributor adapted to connect with a telephone system, the distributor being configured to connect a telephone call using the telephone system and output the telephone call and associated data of the telephone call; and a plurality of customer service representative terminals connected with the distributor and a selected customer service representative terminal being configured to receive the telephone call and the associated data, the distributor and the selected customer service representative terminal being configured to synchronize application of the telephone call and associated data from the distributor to the selected customer service representative terminal.

A second embodiment of the present invention provides a communication system comprising: a distributor configured to connect at least one of an inbound communication and an outbound communication, and output the communication and associated data corresponding to the communication; media configured to connect with the distributor and transport the communication and the associated data; and a terminal configured to connect with the media and receive the communication and the associated data.

Another embodiment of the present invention provides a system configured to distribute a telephone call, the system comprising: a plurality of terminals configured to receive a telephone call and associated data corresponding to the telephone call; a communication server configured to receive the telephone is call from an individual and provide associated data regarding the telephone call responsive to one of input from the individual and identification data corresponding to the telephone call, the communication server being configured to select one of the terminals responsive to the associated data and output the associated data and the telephone call to the selected terminal; the communication server and selected terminal being configured to synchronize the transmission of the associated data and telephone call from the communication server to the selected terminal with the communication server being configured to output the associated data to the selected terminal, the selected terminal being configured to output an indication signal to the communication server responsive to reception of the associated data, the communication server being configured to output the telephone call responsive to reception of the indication signal; and a simultaneous voice and data device configured to simultaneously transport the telephone call and the associated data via a single communication channel intermediate the communication server and the selected terminal.

In another embodiment a communication method comprises: connecting a communication with a distributor; providing associated data corresponding to the communication; forwarding the associated data to a terminal; forwarding the communication to the terminal; and synchronizing the forwarding the associated data and the forwarding the communication.

According to another embodiment, a method of routing a telephone call to a customer service representative comprises: connecting a telephone call of a caller; providing associated data identifying the caller; selecting a customer service representative in response to the identified caller; opening a communications channel with the selected customer service representative; transferring the associated data identifying the caller to the customer service representative; and connecting the caller with the selected customer service representative after the selected customer service representative receives the associated data identifying the caller.

Referring to FIG. 1, a distributed network communication system 10 configured for routing and distributing a communication to a terminal is illustrated. The terminals can be utilized for a variety of purposes including providing connections to customer service representatives, third parties, clients, supervisors, etc. Preferably, bidirectional or duplexed communications are provided.

In addition, communications can be coupled with one terminal or a plurality of terminals. Forwarding of communications is provided in at least one embodiment. Exemplary communications within distributed network system 10 include data and voice communications.

The depicted distributed network system 10 includes a call center 60, plurality of remote terminals 16, and media 20 as shown in FIG. 1. Media 20 is configured to transport communications intermediate call center 60 and remote terminals 16. Media 20 can also comprise an internal network of call center 60 to provide communications with in-house customer service representatives within call center 60 (the internal network and in-house customer service representatives are not shown in FIG. 1).

The illustrated remote terminals 16 include customer service representative (CSR) terminals 15 and client terminals 17 of distributed network communication system 10. The number of terminals 16 shown is exemplary and more or less terminals are provided in other embodiments. Distributed network system 10 according to the present invention can and typically will include additional terminals 16 to accommodate the needs of the organization utilizing the communication system. Terminals 16 individually comprise personal computers in the described embodiments. Exemplary personal computers include computers having Pentium® processors available from Intel Corporation.

In one embodiment, CSR terminals 15 are utilized by if customer service representatives to assist customers. Client terminals 17 are utilized to provide monitoring of communications intermediate a customer and a customer service representative in such an embodiment. The monitoring can be utilized for quality assurance or other purposes.

Distributed network system 10 is adapted to communicate with one or more customer terminals 18. Exemplary customer terminals 18 include telephones. Call center 60 is configured it to receive inbound communications from customer terminals 18 and is place outbound communications to terminals 18. The communications can correspond to voice communications of an individual coupled via customer terminal 18. In particular, the inbound communications can comprise voice communications (i.e., telephone calls) regarding product information, comments or any other communications which may be utilized by a distributed workforce comprising a plurality of customer service representatives. Outbound communications can be utilized by a user of network 10 for marketing, surveys, etc in exemplary applications.

Media 20 is coupled intermediate call center 60, and terminals 16, 18. In the arrangement depicted in FIG. 1, media 20 includes a telephone system 14 and a plurality of connections 22, 24, 26, 28. Telephone system 14 is preferably configured to transport inbound communications (i.e., communications from customer terminals 18 to call center 60) and outbound communications (i.e., communications from call center 60 to customer terminals 18). In one embodiment, telephone system 14 comprises a public switched telephone network (PSTN network). A packet switched network, such as the Internet, configured to transport associated data is included in one embodiment of media 20. Such may be implemented using software residing within call center 60 and terminals 15, 17 in an exemplary embodiment.

Although highly simplified in FIG. 1, connections 22, 24, 26, 28 can comprise a plurality of analog RJ11 connections, T-1 digital connections, or Integrated Services Digital Network (ISDN) connections. Other suitable analog or digital connections configured to transport voice and data communications can be utilized.

Connection 22 couples telephone system 14 with call center 60. Plural connections 24 connect respective remote CSR terminals 15 with telephone system 14. Plural connections 28 couple respective client terminals 17 with telephone system 14. Pural connections 26 connect respective customer terminals 18 with telephone system 14.

In one embodiment, media 20 includes simultaneous voice and data (SVD) devices coupled with connections 22, 24, 28 for providing simultaneous voice and data communications via one line. SVD devices can be additionally coupled with connections 26 for voice and data communications with customer terminals 18.

Such simultaneous voice and data devices can be implemented in either analog or digital configurations. One exemplary commercially available SVD modem is the AT&T DataPort® 2001 modem. Simultaneous voice and data devices are configured to simultaneously transmit a voice signal and a data signal using one communication line (e.g., a single POTS or PSTN connection). During SVD communications, voice and data can be communicated using plural virtual channels over one line.

In a preferred embodiment, a distributor (not shown in FIG. 1) of call center 60 and the selected remote terminal 16 or in-house terminal are configured to synchronize application of the communication and associated data from distributor 12 to the selected remote terminal 16 or in-house terminal. In particular, distributor 12 can be configured to output the communication to the selected terminal responsive to associated data regarding the communication being received within the individual remote terminal 16 or in-house terminal.

More specifically, following the provision or generation of the associated data corresponding to the call or communication, the distributor is configured to forward the associated data to the terminal. In other embodiments, the associated data can be forwarded to multiple terminals if communications are to be established with multiple customer service representatives, clients and/or third parties. As discussed in detail below, the selected terminal is configured in one embodiment to output an indication signal responsive to reception of the associated data. Thereafter, the distributor is configured to output the voice communication to the terminal responsive to receiving the indication signal from the individual terminal.

Following the routing of a voice communication from the distributor to the appropriate CSR terminal and/or client terminal, bidirectional or duplexed communications can occur intermediate the appropriate customer terminal 18 and the selected terminal(s) within system 10. Furthermore, communications from customer terminal 18 can be forwarded from the presently utilized terminal to another terminal for additional assistance, verification, monitoring of communications or other functions.

Figure 2:
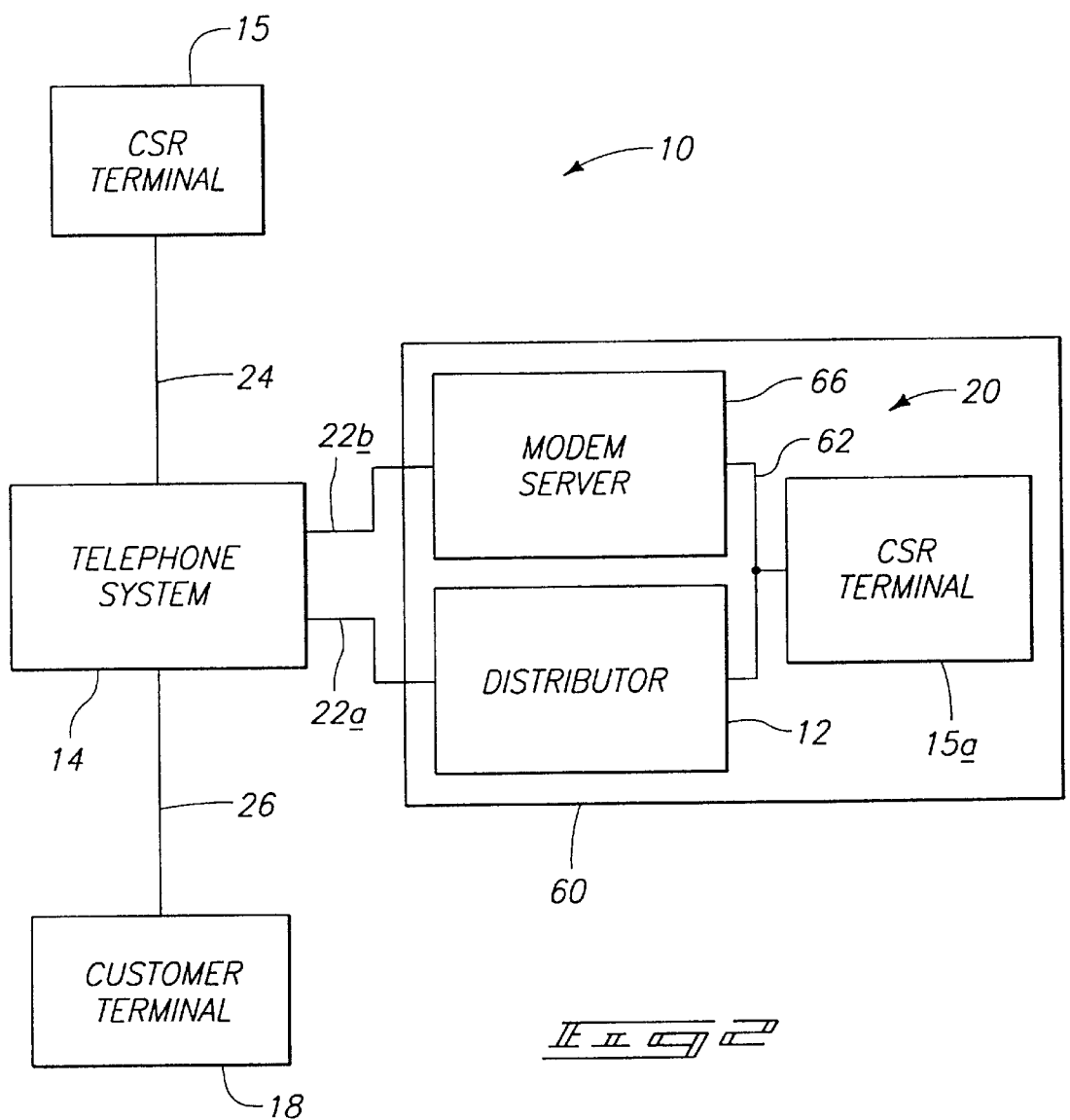
FIG. 2 is a functional block diagram of a subcomponent of the distributed network.

Referring to FIG. 2, call center 60 is shown coupled with a remote CSR terminal 15 of system 10. The depicted call center 60 comprises a distributor 12, in-house CSR terminal 15a and modem server 66. Call center 60 can also include client terminals or other terminal configurations. Media 20 comprises a local area network 62 coupled with distributor 12, terminal 15a and modem server 66 in the depicted embodiment.

Distributor 12 comprises an automatic call distributor (ACD) one embodiment. The automatic call distributor can comprise communication server, such as a telephony server. An exemplary communication server comprises an Optiplex GXa available from Dell Computer Corporation and is available to process and route data and voice communications.

In one embodiment, distributor 12 is configured to connect to inbound communications directed to distributed network system 10 from a caller. In another embodiment, distributor 12 is configured for "predictive dialing" wherein distributor 12 dials a plurality of outbound communications corresponding to information within a database. Distributor 12 is thereafter connected to the outbound communication responsive to the outbound communication being answered.

Distributor 12 is configured to output associated data corresponding to inbound and outbound communications and the voice communications to a customer service representative via telephone system 14 according to one embodiment. Distributor 12 is configured in one described embodiment to determine the associated data regarding or corresponding to the communications. The associated data can comprise identification information corresponding to the calling or called individual.

Figure 3:
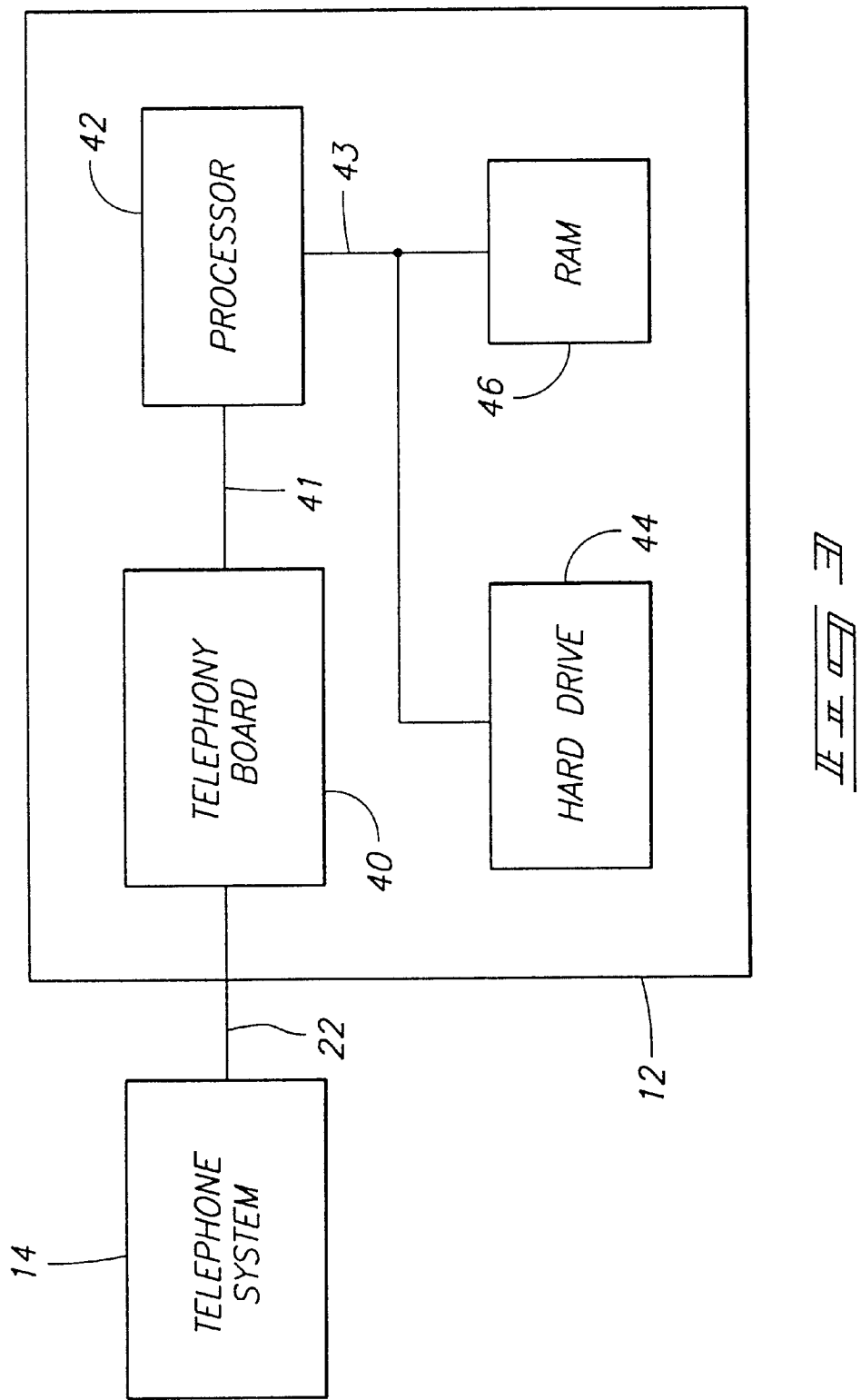
FIG. 3 is a functional block diagram of one embodiment of distributor of a distributed network.

Referring to FIG. 3, one embodiment of distributor 12 is illustrated. The depicted distributor 12 comprises a telephony server including at least one telephony board 40, bus 41, processor 42, hard drive 44, and random access memory (RAM) 46.

Telephony board 40 is coupled with telephone system 14 via connection 22. In one embodiment, telephony board 40 comprises a D/240SC-T1 board available from Dialogic Corporation. Telephony board 40 is preferably configured to provide connection to multiple telephone channels within telephone system 14 using connection 22. Telephony board 40 can be additionally configured to automatically answer calls, play voice messages (e.g., interactive voice response IVR messages) to a caller, detect touch tones inputted from an individual caller, and place outbound calls via connection 22.

Processor 42 is coupled with telephony board 40 via ISA bus 41. Bus 41 can comprise an ISA, PCI or other bus configuration. Hard drive 44 and random access memory 46 are coupled with processor 42 via a connection 43. In the depicted embodiment, hard drive 44 is configured to store a database containing pertinent information such as information regarding individual customers.

At least one of hard drive 44 and random access memory 46 are configured to store packet switched network software, such as Internet service provider (ISP) software and Internet protocol (IP) telephony software, in one embodiment. The packet switched network software is configured to provide associated data communications and/or voice communications via a packet switched network. Such can be implemented utilizing modem server 66 of call center 60.

A customer service representative or client having a particular specialty matching the needs of the customer is preferably identified. Such identification of a customer service representative can comprise utilization of a database upon hard drive 44, the associated data of the customer or other information. Following identification or selection of the appropriate customer service representative or client, distributor 12 routes communications to the corresponding CSR or client terminal. Communications can be routed to plural CSR and/or client terminals. Connected terminals can include remote terminals 16 and in-house terminals 15*a*.

Distributor 12 initially applies the associated data is corresponding to the communication to the selected CSR or client 14 terminal 15, 15*a*, 17 in a preferred embodiment of the invention. The voice communication is thereafter applied to CSR or client terminals 15, 15*a*, 17 following receipt of the associated data within respective terminal 15, 15*a*, 17 in such an embodiment. Application of the communication creates a bi-directional or duplexed communication channel intermediate the calling customer terminal 18 and the appropriate CSR or client terminal 15, 15*a* 17 in the described embodiment of the invention.

In a first embodiment, distributor 12 is configured to determine the associated data regarding the communication responsive to identification information or data corresponding to the individual. Such identification information can comprise automatic number identification (ANI) information or caller identification (caller ID) information.

In another embodiment, distributor 12 utilizes dialed number identification service (DNIS) information which recognizes the number dialed to reach call center 60.

In another embodiment, the associated data is generated from input received from an individual or customer using customer terminal 18. More specifically, distributor 12 is configured to play an interactive voice response (IVR) menu routine. The input entered by the customer or caller responsive to the interactive voice response menu can be utilized by distributor 12 to provide the associated data. Other methods for providing or ascertaining the associated data are possible.

Figure 4:
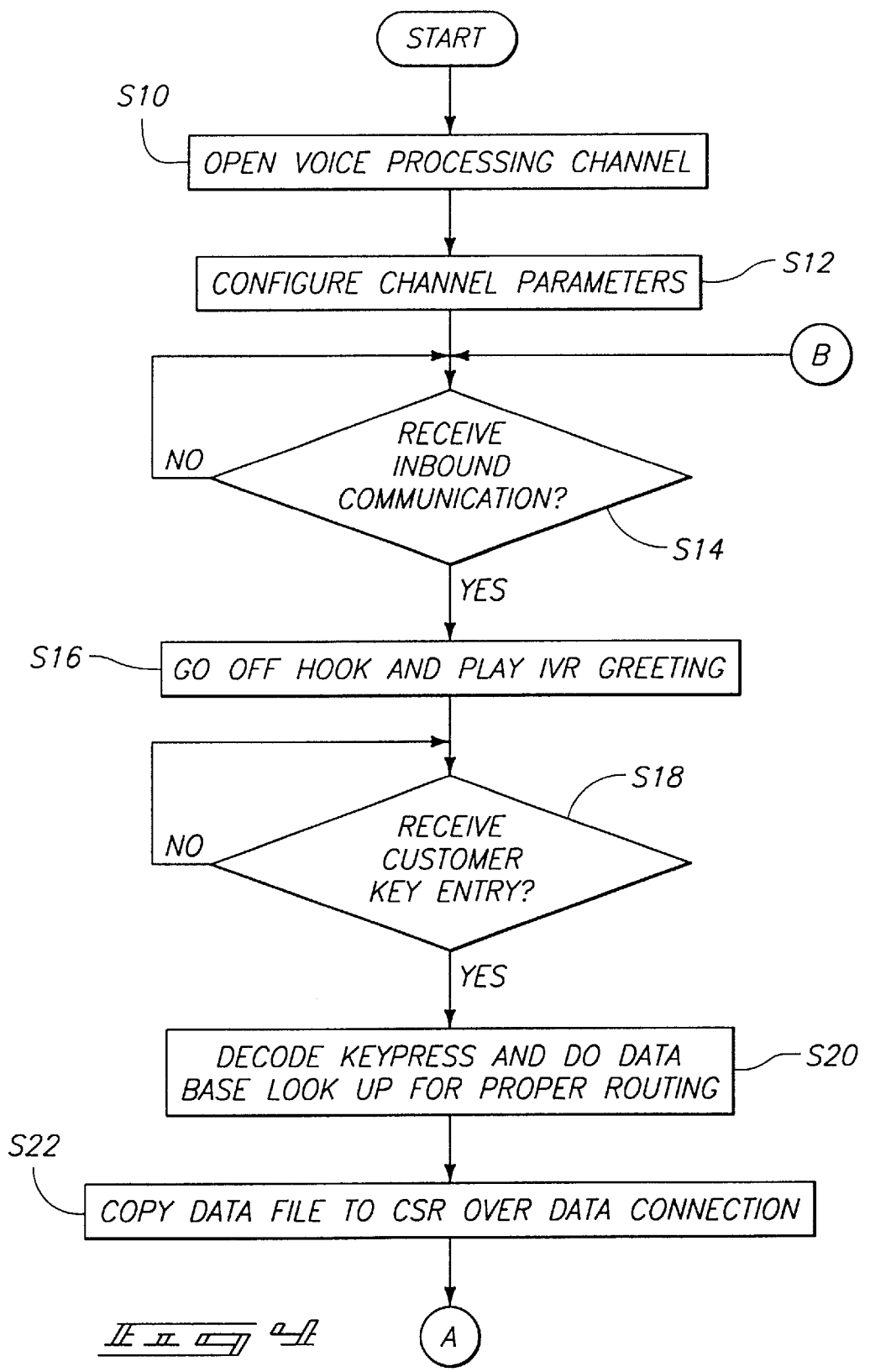
FIGS. 4 and 5 are flow charts illustrating software functions of one embodiment of a distributed network.
Figure 5:
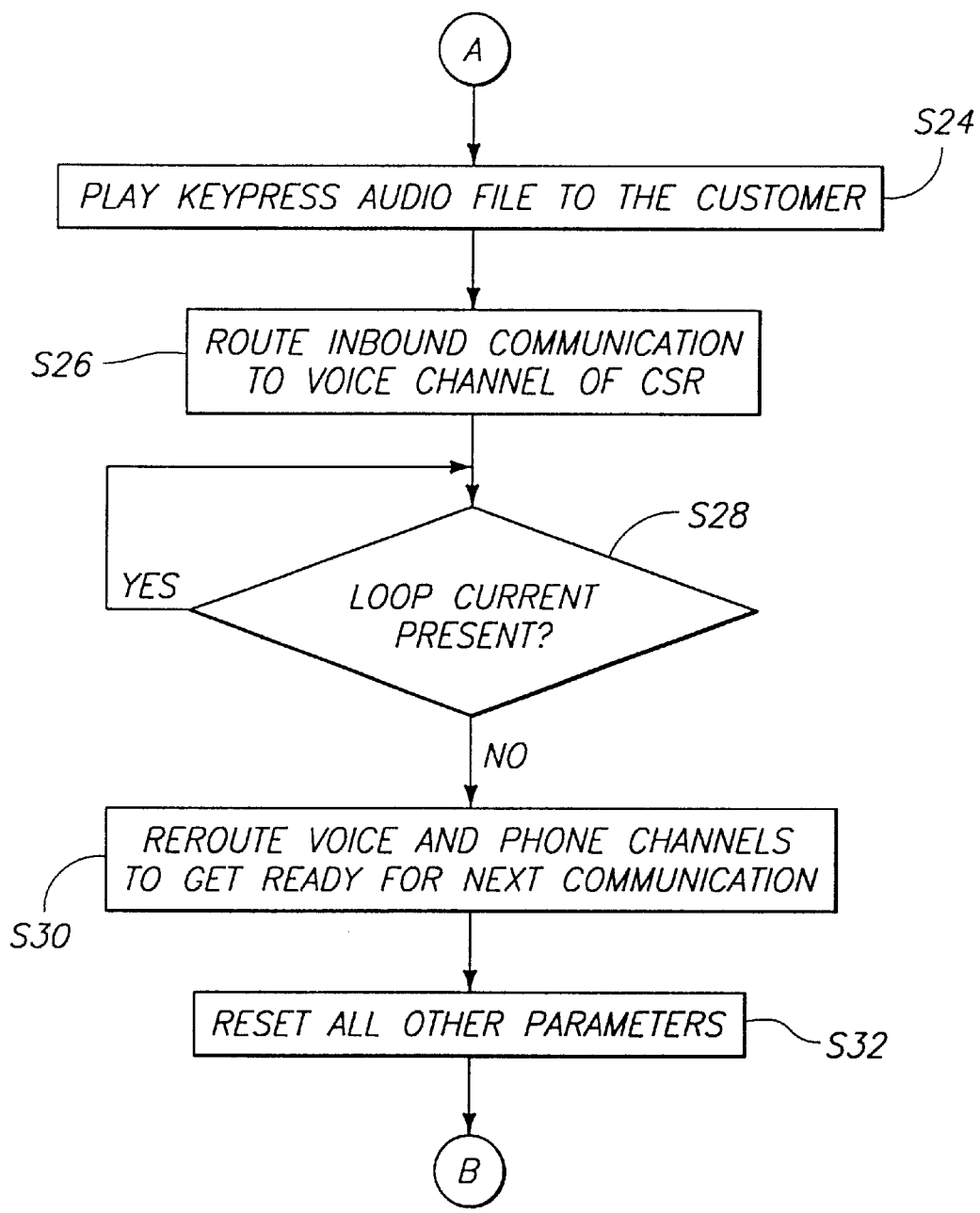

Referring to FIGS. 4 and 5, one method of distributing a telephone call or communication and associated data within network 10 is described. The method described with reference to FIGS. 4 and 5 is exemplary and other methods can be utilized in accordance with, the present invention. Software configured to implement the depicted distribution method is stored within hard drive 44 or random access memory 46 of the depicted distributor 12. Processor 42 is configured to execute the software. Telephony board 40 is configured to execute the described method in another embodiment. The described methodology is implemented within a hardware configuration in other embodiments of the invention.

Referring specifically to FIG. 4, processor 42 initially proceeds to step S10 and opens one or more voice processing channels of telephone system 14. Processor 42 thereafter proceeds to step S12 to configure the parameters of the previously opened voice processing channels. At step S14, processor 42 monitors for the reception or connection of a communication via a channel opened within connection 22 coupled with telephone system 14. Processor 42 idles at step S14 until a communication is connected (i.e., received or placed). Processor 42 is configured to detect rings at step S14 and go off-hook and receive in-bound communications. Processor 12 is configured to receive automatic number identifications (ANI) information or dialed number identification service (DNIS) information intermediate first and second rings of an in-bound if communication in one embodiment.

Following the reception or connection of a communication at step S14, processor 42 proceeds to step S16. Telephony board 40 detects the inbound call, and indicates the presence of the call to processor 42. Processor 42 instructs telephony board 40 to go off hook at step S16. In addition, telephony board 40 is instructed to play an interactive voice response (IVR) greeting requesting input from the individual caller.

Following playback of the greeting, processor 42 proceeds to step S18 where it awaits reception of a customer key entry. If the customer correctly enters a key pad response, processor 42 proceeds to step S20. Otherwise, processor 42 idles at step S18 until a correct response is received. Alternatively, step S18 can comprise utilizing automatic number identification (ANI) information, dialed number identification service (DNIS) information or other information from the telephone call.

Processor 42, at step .S20, decodes data inputted from the individual customer and performs a look up of the database stored upon hard drive 44. Alternatively, ANI and DNIS is utilized to perform the lookup. The look up is performed in order to select an appropriate customer service representative and corresponding terminal 15. Following identification of the appropriate CSR terminal 15, processor 42 proceeds to step S22 in the described embodiment. Processor 42 is configured to copy or apply the associated data (e.g., data file corresponding to the calling customer) to the selected customer service representative and CSR terminal 15 over an established data connection including connection 22, telephone system 14 and connection 24. Application of the data file to CSR terminal 15 results in a "screen-pop" of the associated data upon monitor 48 of CSR terminal 15 in the preferred embodiment.

Following the application of the data file and receipt of the data file at CSR terminal 15, the voice communication can be connected to the appropriate customer service representative. Distributed network system 10 is configured to apply the appropriate associated data within a data file to the customer service representative before establishing a voice communication between the calling customer and the customer service representative in the preferred embodiment.

At step S24, processor 42 is configured to play a key press audio file to the customer at terminal 18. Such an audio file informs the calling customer that they are being connected to a customer service representative. The audio file may identify the specialty of the customer service representative.

Following receipt of the associated data file at CSR terminal 15, processor 42 routes the voice communication to a voice/audio interface of CSR terminal 15 at step S26. Routing of the voice communication to the voice channel of CSR terminal 15 establishes a bi-directional or duplexed communication intermediate customer terminal 18 and the selected CSR terminal 15.

Processor 42 thereafter monitors for the presence of a loop current within an established analog channel intermediate customer terminal 18 and CSR terminal 15 at step S28. Monitoring of the loop current at step S28 enables distributor 12 to monitor the use of the established channel. The A-B bits of a T-1 digital communication system, or the ABCD bits of an E-1 digital system can also be utilized to detect a hang-up condition.

Following the detection of an absence of the loop current at step S28, processor 42 proceeds to step S30 to reroute voice and phone channels for receipt or placement of the next voice communication. Processor 42 thereafter resets all appropriate parameters of the channels at step S32. Processor 42 subsequently proceeds to step S14 to monitor the receipt or placement of another voice communication. Distributed network system 10 can simultaneously process numerous communications in the preferred embodiment.

Following selection of a remote customer service representative or client, distributor 12 is configured to output associated data corresponding to the communication via modem server 66 and the packet switched network in the described embodiment. The call or voice communication is also supplied via telephony board 40 to the selected remote CSR or client terminal 16 using telephone system 14. Both the voice communication and associated data can be provided to a selected remote CSR or client terminal 16 via a single connection utilizing SVD modems within the terminal and modem server in another embodiment. The call and data can also be applied to an in-house terminal within call center 60.

Figure 6:
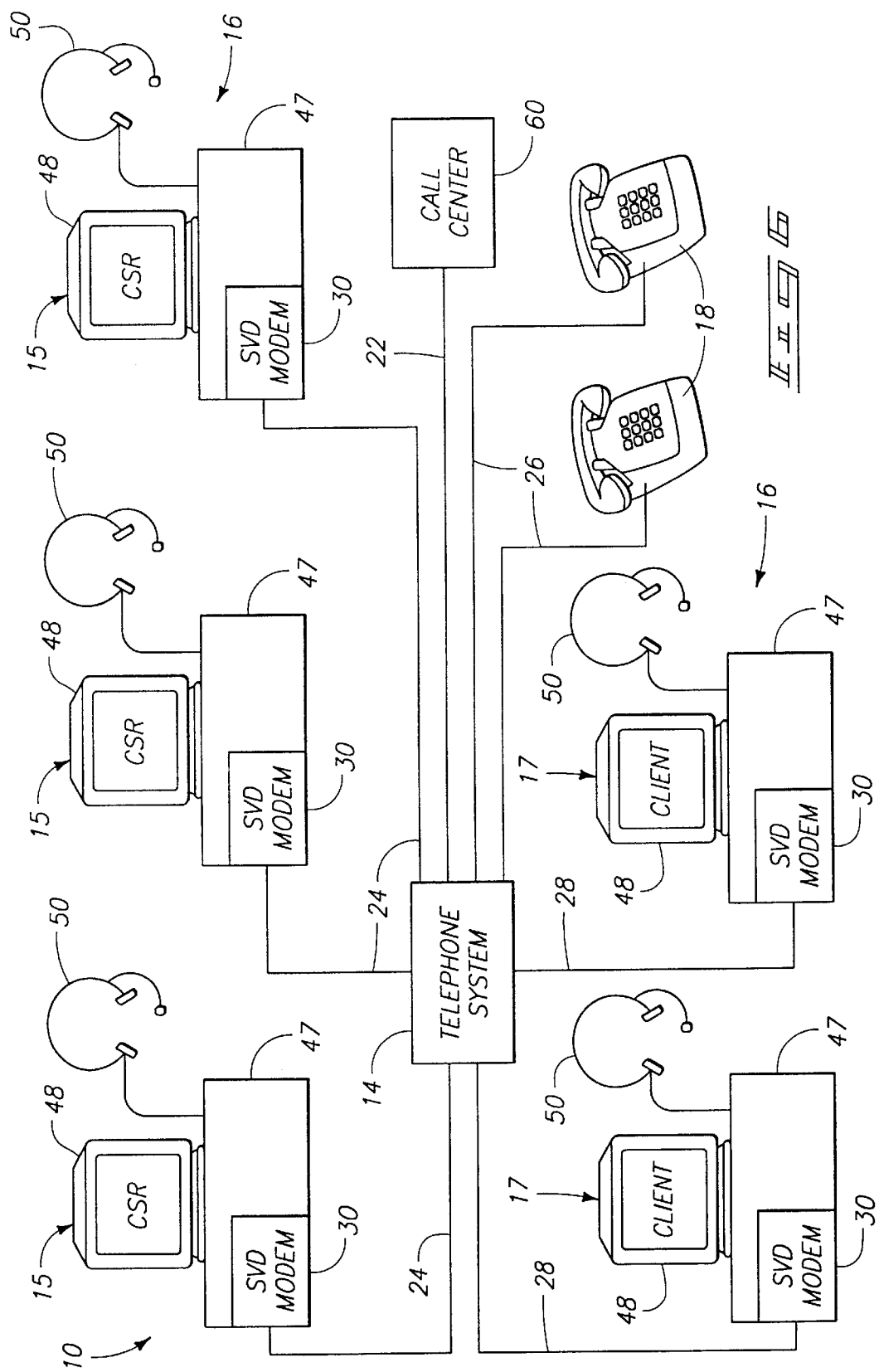
FIG. 6 is a high-level schematic representation of one embodiment of a distributed network corresponding to FIG. 2.

Referring to FIG. 6, routing of an inbound communication from customer terminal 18 to a selected remote CSR terminal 15 is illustrated. Communications can also be routed to internal CSR terminals 15a (not shown in FIG. 6) within call center 60. The embodiment of distributed network system 10 illustrated in FIG. 6 utilizes SVD modems within modem server 66 of call center 60 and remote CSR terminals 15 to provide simultaneous voice and data communications.

Initially, an individual generates an inbound communication or telephone call via customer terminal 18. Customer terminal 18 is connected with telephone system 14 in the described embodiment via connection 26. The inbound communication is applied to telephone system 14. Responsive to an individual customer dialing an appropriate number for call center 60, telephone system 14 applies the inbound communication or customer a call to call center 60 via connection 22a (shown in FIG. 2).

Distributor 12 thereafter selects an appropriate customer service representative to process the inbound communication. Subsequent to the identification of an appropriate customer service representative, distributor 12 simultaneously applies the inbound voice communication and associated data via one connection 22b to telephone system 14 using modem server 66.

The inbound (voice) communication and associated data are simultaneously transmitted through a communication channel of telephone system 14 to connection 24 and the selected CSR terminal 15. In another embodiment, distributor 12 initiates is communications by dialing outbound communications to an individual and thereafter forwards such communications to a CSR terminal 15, 15a.

CSR terminals 15 individually include hardware 47 comprising respective simultaneous voice and data (SVD) modems 30. SVD modems 30 of CSR terminals 15 are coupled via respective connections 24 with telephone system 14. SVD modems 30 of client terminals 17 are coupled via connections 28 with telephone system 14.

Utilization of simultaneous voice and data devices 30 enables application of voice communications and associated data via a single communication line within connection 22, telephone system 14 and connections 24, 28.

Illustrated remote terminals 16 include a visual interface 48 and an audio/voice interface 50. The application of associated data from distributor 12 to a selected terminal 15, 17 results in the appearance (screen-pop) of the associated data upon the monitor or visual interface 48 of terminal 15. The customer service representative can view the associated data using monitor 48 and converse with the customer via audio/voice interface 50.

Figure 7:
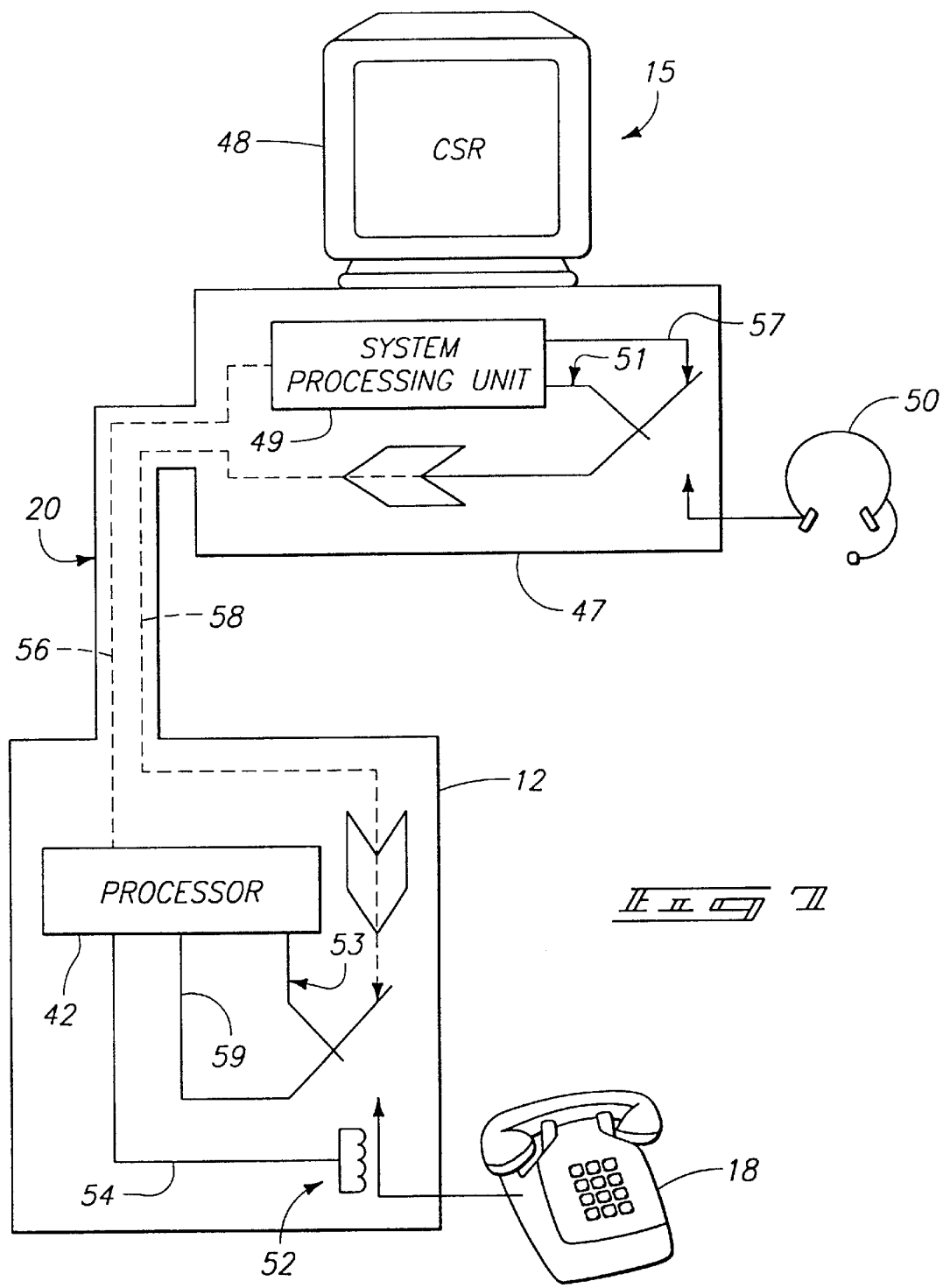
FIG. 7 is an illustrative representation of data communications intermediate a customer terminal and a customer service representative terminal within the distributed network.

Referring to FIG. 7, application of a voice communication it and associated data which corresponds to the communication to a selected CSR terminal 15 according to one embodiment is described. A call or communication corresponding to a customer terminal 18 is received or placed using distributor 12 (the communication is typically received or placed via telephone system 14 although such is not shown in FIG. 7). An inductive device 52 such as a transformer is utilized in the described embodiment to extract the communication from the connection with customer terminal 18.

A voice processing link 54 within distributor 12 is configured to apply the received communication to processor 42. An information look up occurs within distributor 12 wherein processor 42 chooses the appropriate customer service representative to handle the incoming communication.

Following the look up, data associated with the communication is transferred to CSR terminal 15 corresponding to the selected customer service representative. Media 20 in the described embodiment includes a data channel 56 and a voice channel 58. Data channel 56 and voice channel 58 of media 20 can be implemented using telephone system 14 and connections to telephone system 14 although these details are not shown in FIG. 7. In SVD applications, data channel 56 and voice channel 58 are implemented utilizing a single line.

The illustrated CSR terminal 15 includes a system processing unit 49 configured to receive the associated data and provide synchronization of data and voice communications. The associated data (e.g., customer information) is applied to system processing unit 49 of CSR terminal 15 via data connection 56. Following the transfer of at least a portion of the associated data, system processing unit 49 injects a signaling tone or indication signal upon voice channel 58 (represented by arrows in FIG. 7) in one embodiment. The signaling tone is applied via voice channel 58 and input 59 to processor 42 of distributor 12.

Figure 8:
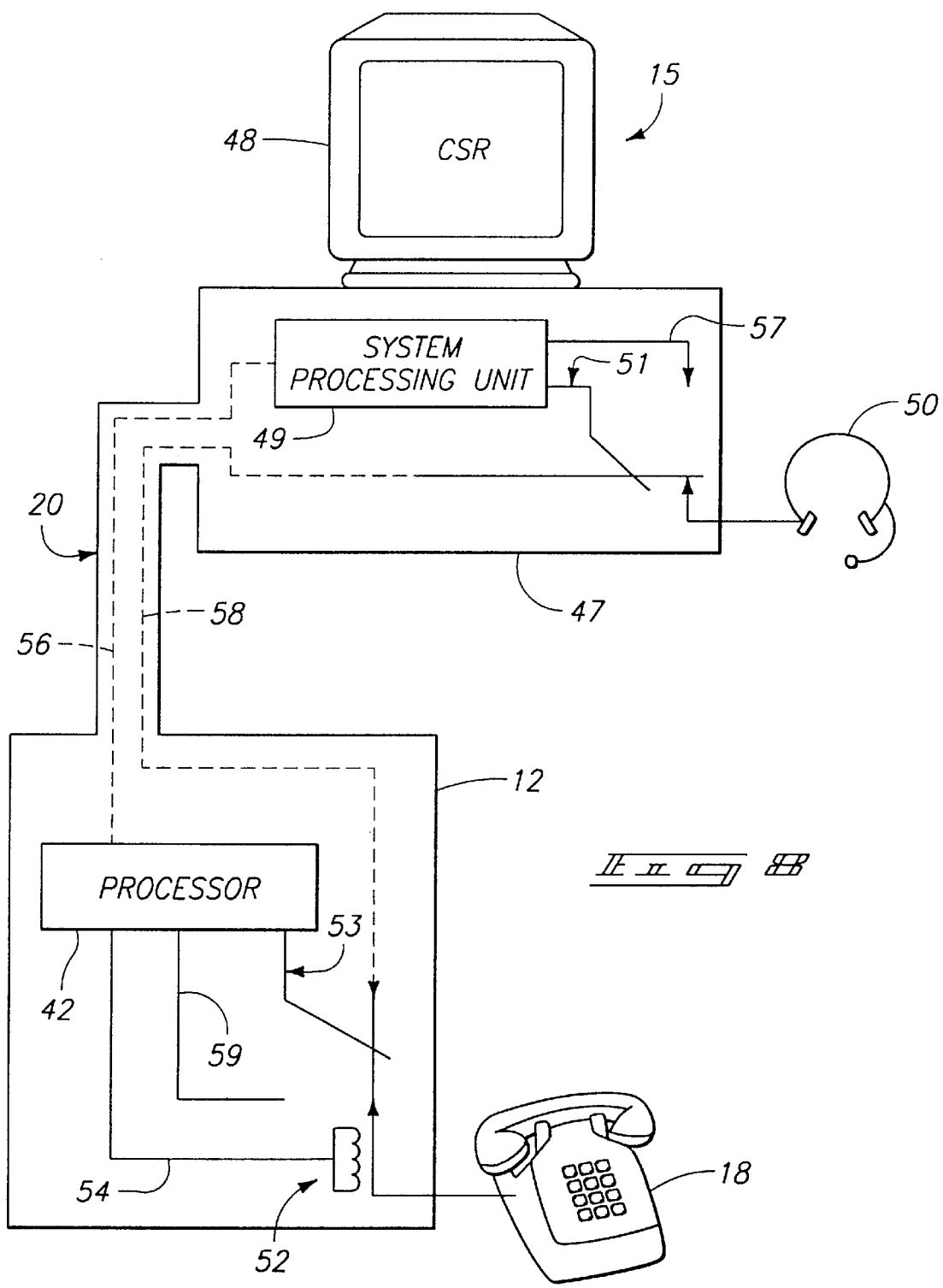
FIG. 8 is an illustrative representation, similar to FIG. 7, of a voice communication being coupled intermediate the customer terminal and the customer service representative terminal.

Referring to FIG. 8, system processing unit 49 operates a gating control 51 to selectively couple voice channel 58 with one of audio/voice interface 50 of CSR terminal 15 and an output 57 of system processing unit 49. System processing unit 49 selectively couples voice channel 58 with output 57 using gating control 51 for application of the indication signal. Thereafter, system processing unit 49 selectively couples voice channel 58 with audio/voice terminal 50 using gating control 51 following injection of the indication signal upon voice channel 58.

Following receipt of the indication signal via voice channel 58 and input 59, processor 42 operates gating control 53 to couple customer terminal 18 with voice channel 58. In particular, processor 42 removes a block upon the voice channel responsive to reception of the indication signal at input 59. Thereafter, the customer at customer terminal 18 and the customer service representative at CSR terminal 15 are connected for duplexed, bidirectional voice communications.

Figure 9:
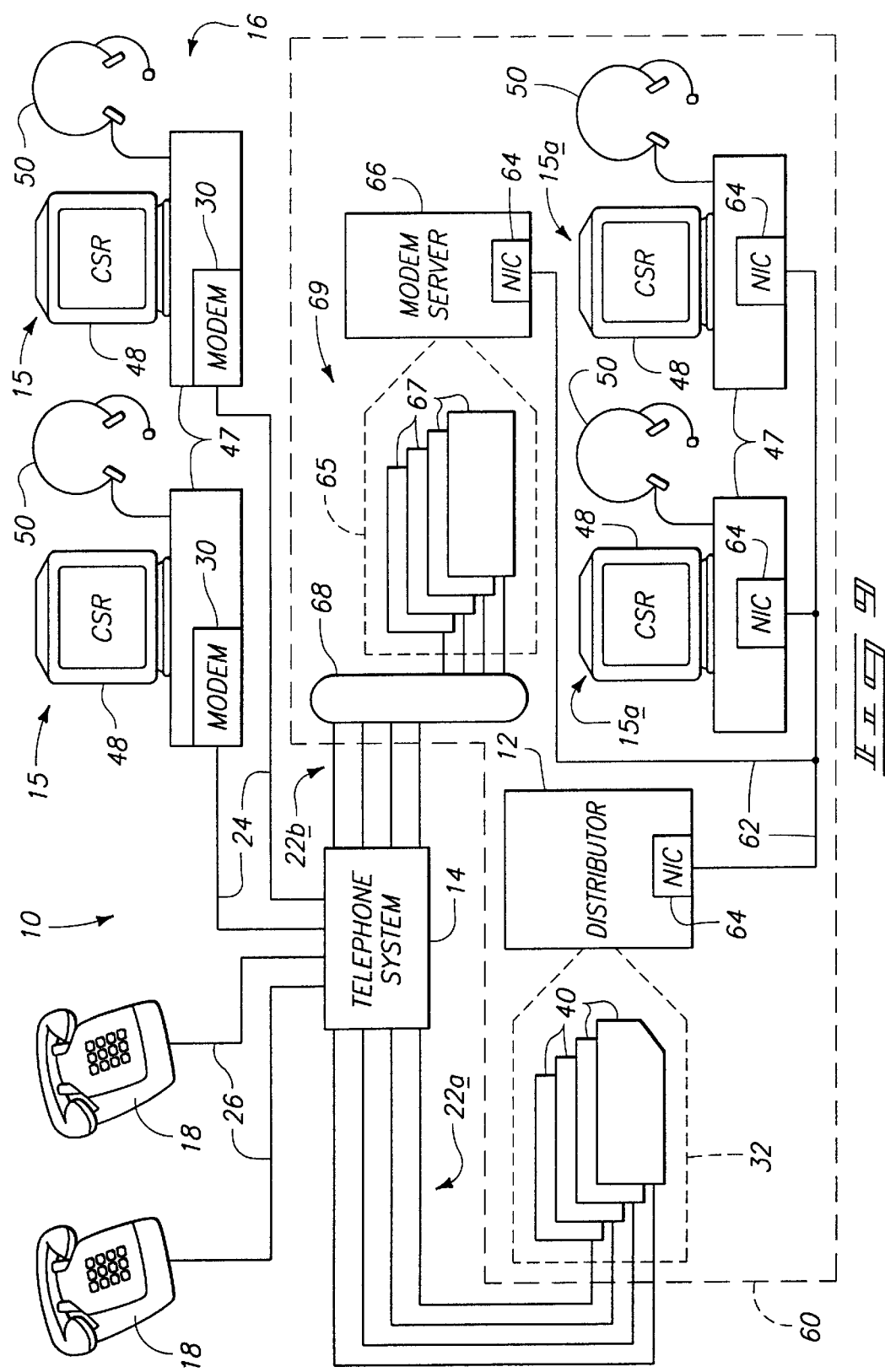
FIG. 9 is a schematic diagram of an embodiment of a distributed network corresponding to FIG. 2.

Referring to FIG. 9, plural embodiments of distributed network system 10 corresponding to FIG. 2 are described. In a first embodiment, voice and data communications intermediate distributor 12 and remote CSR terminals 15 are provided utilizing a simultaneous voice and data (SVD) protocol. In an alternative embodiment, a packet switched network 69, such as the Internet, is utilized to implement voice and data communications with remote CSR terminals 15.

Call center 60 depicted in FIG. 9 includes distributor 12, plural in-house CSR terminals 15a, internal network 62, modem server 66 and an interface 68. In one configuration, internal network 62 comprises a local area network (LAN) having an ethernet configuration. A plurality of in-house customer service representatives are coupled with local area network 62 in the depicted embodiment using in-house CSR terminals 15a.

In-house CSR terminals 15a, distributor 12, and modem server 66 individually include network interface cards (NIC) 64. Network interface cards 64 are individually coupled with internal network 62 and provide interfacing to the network. Exemplary network interface cards 64 include Ethernet III 3C509 cards available from 3 Com Corporation.

Distributor 12 of FIG. 9 includes telephony resources 32 comprising a plurality of telephony boards 40. Provision of plural telephony boards provides additional communication channels permitting handling of an increased number of communications. Individual telephony boards 40 provide a plurality of communication channels in the preferred embodiment.

Inbound communications originate within customer terminals 18 and are applied via connections 26 to telephone system 14. Outbound communications are dialed by distributor 12 and placed to customer terminals 18. Inbound and outbound communications are applied via connections 22a from telephone system 14 to telephony resources 32 of distributor 12.

Following identification of the calling customer, distributor 12 performs look up operations to identify an appropriate customer service representative. Alternatively, pipelining of customer service representatives is utilized for selection wherein a next suitable CSR is chosen.

Distributor 12 thereafter operates to provide a communication channel between the connected customer terminal 18 and the selected remote CSR terminal 15, and/or in-house CSR terminal 15a within call center 60. In the preferred embodiment, distributor 12 provides the associated data to the selected customer service representative prior to establishing bi-directional or duplexed voice communications between the selected CSR terminal 15, 15a and customer terminal 18.

If the selected customer service representative is within call center 60, distributor 12 creates a data channel and voice channel using the distributor network interface card 64 and local area network 62. The data and voice communications pass through the network interface card 64 of the selected CSR terminal 15a.

In accordance with the first embodiment, network 10 is configured to implement communications with remote terminals 16 using a simultaneous voice and data (SVD) protocol. Inbound voice communications are preferably digitized within distributor 12. Associated data and digitized voice are applied via network 62 to modem server 66.

Modem server 66 comprises an Optiplex Pentium computer available from Dell Computer Corporation in the described embodiment. The illustrated modem server 66 includes an internal modem pool 65 comprising plural modem boards 67. Modem boards 67 can comprise AT&T DataPort® 2001 modems in one embodiment. Modem boards 67 individually provide plural bi-directional communications intermediate telephone system 14 and distributor 12.

Remote CSR terminals 15 also include respective SVD modems 30 in the depicted arrangement. Modem boards 67 are configured to implement the SVD operations and communicate voice and data with SVD modems 30 of remote terminals 16 using one communication line through telephone system 14. Exemplary modems 30 comprise AT&T DataPort® 2001 modems. Modem boards 67 are configured to multiplex the voice and data onto one line in such an embodiment.

Distributed network system 10 is configured to provide voice and data communications over a packet switched network 69 in another embodiment when a remote customer service representative using a remote CSR terminal 15 is selected. In such an embodiment, distributor 12 can include web server software, such as IIS Software available from Microsoft Corporation, which is capable of implementing Internet service provider (ISP) capabilities.

Exemplary software for individual terminals 16 for implementing packet switched communications comprises Windows 95 available from Microsoft Corporation and browser software, such as Explorer available from Microsoft Corporation and Netscape Navigator available from Netscape Communications Corporation. Software of terminals 16 is preferably stored with respective hardware 47 of terminals 16. The browser and web server software is preferably configured to maintain a data connection and/or voice connection intermediate call center distributor 12 and at least one remote or distributed CSR terminal 16.

Network 10 can be configured for Internet protocol (IP) telephony operations wherein both data and voice communications are provided using packet switched network 69. IP telephony software, such as MS Netmeeting available from Microsoft Corporation, can be utilized in an exemplary embodiment to it provide voice and data communications over packet switched network 69. The IP telephony software is provided within distributor 12 of call center 60 and hardware 47 of respective remote terminals 16 in an exemplary packet switched network embodiment.

Initially, voice communications are digitized within distributor 12. Associated data corresponding to the communication and the digitized voice are applied via distributor network interface card. 64 and internal network 62 to the network interface card 64 of modem server 66. The voice and data communications can thereafter occur intermediate a selected remote terminal 16 and call center 60 utilizing packet switched network 69. Modem boards 67 and modems 30 provide plural bi-directional communications intermediate remote terminals 16 and call center 60 utilizing packet switched network 69 in the presently described embodiment.

Modem boards 67 are individually coupled with interface 68. Interface 68 operates to provide analog to digital interfacing with connections 22b coupled with telephone system 14 and modem boards 67 of modem server 66. In one embodiment, interface 68 preferably comprises a T-1 interface if connections 22b comprise T-1 digital connections. A suitable interface 68 is model 3624 Newbridge Networks Corporation.

The associated data and voice communication are directed using packet switched network 69 via telephone system 14 and connection 24 to the selected remote CSR terminal 15. Data and voice communication are established using modems 30. Associated data is viewable via monitor 48 and audio/voice communications are provided using interface 50.

For communications with in-house CSRs, in-bound voice communications: are digitized within distributor 12. The digitized voice and associated data are applied to in-house CSR terminals 15a via network 62 and an associated NIC 64.

Figure 10:
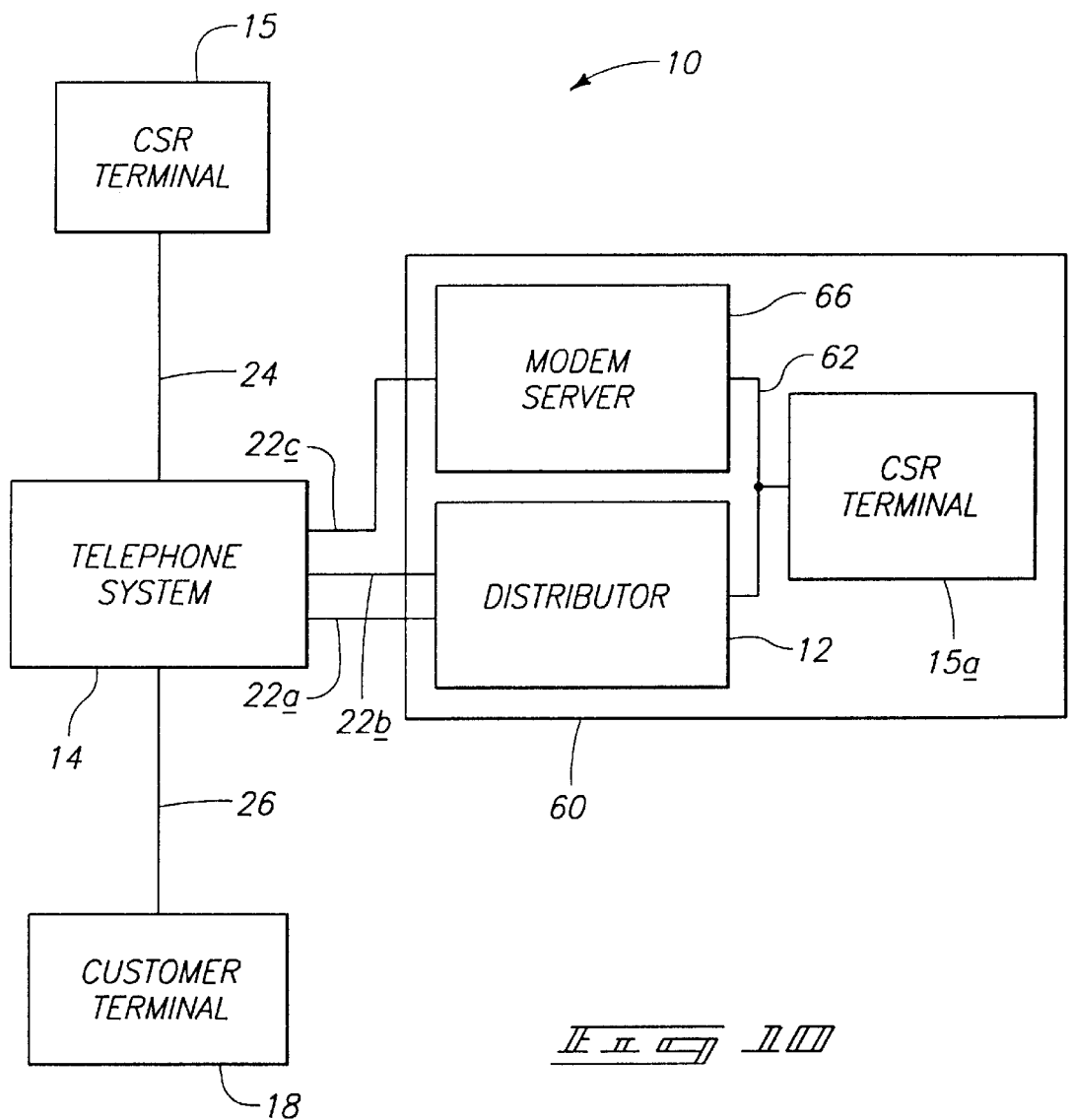
FIG. 10 is a functional block diagram of an embodiment of a subcomponent, similar to FIG. 2, of another distributed network.

Referring to FIG. 10, another embodiment of distributed network 10 is illustrated. A customer or outside party utilizes customer terminal 18 to dial a number associated with call center 60. Thereafter, the communication is supplied via connection 26 through telephone system 14 and connection 22a to call center 60. Initially, the call is received by distributor 12. Responsive to generating or obtaining information (e.g., identification information) relative to customer 18, distributor 12 selects an appropriate customer service representative and associated remote CSR terminal 15 or internal terminal 15a. In another embodiment, customer service representatives are pipelined and distributor 12 is configured to choose the next available customer service representative and associated CSR terminal 15, 15a.

Following selection of a remote customer service representative, distributor 12 dials the appropriate CSR terminal 15 and applies associated data of the inbound or outbound communication to CSR terminal 15. The associated data is applied via connection line 22c, telephone system 14 and connection 24 to CSR terminal 15. Following indication of the receipt of the associated data within CSR terminal 15, distributor 12 applies the voice communication via connection 22b, telephone system 14 and connection 24 to CSR terminal 15. In the embodiment described with reference to FIG. 10, respective connections 22b, 22c and two lines through telephone system 14 and connection 24 are utilized for communication of data and voice information.

Figure 11:
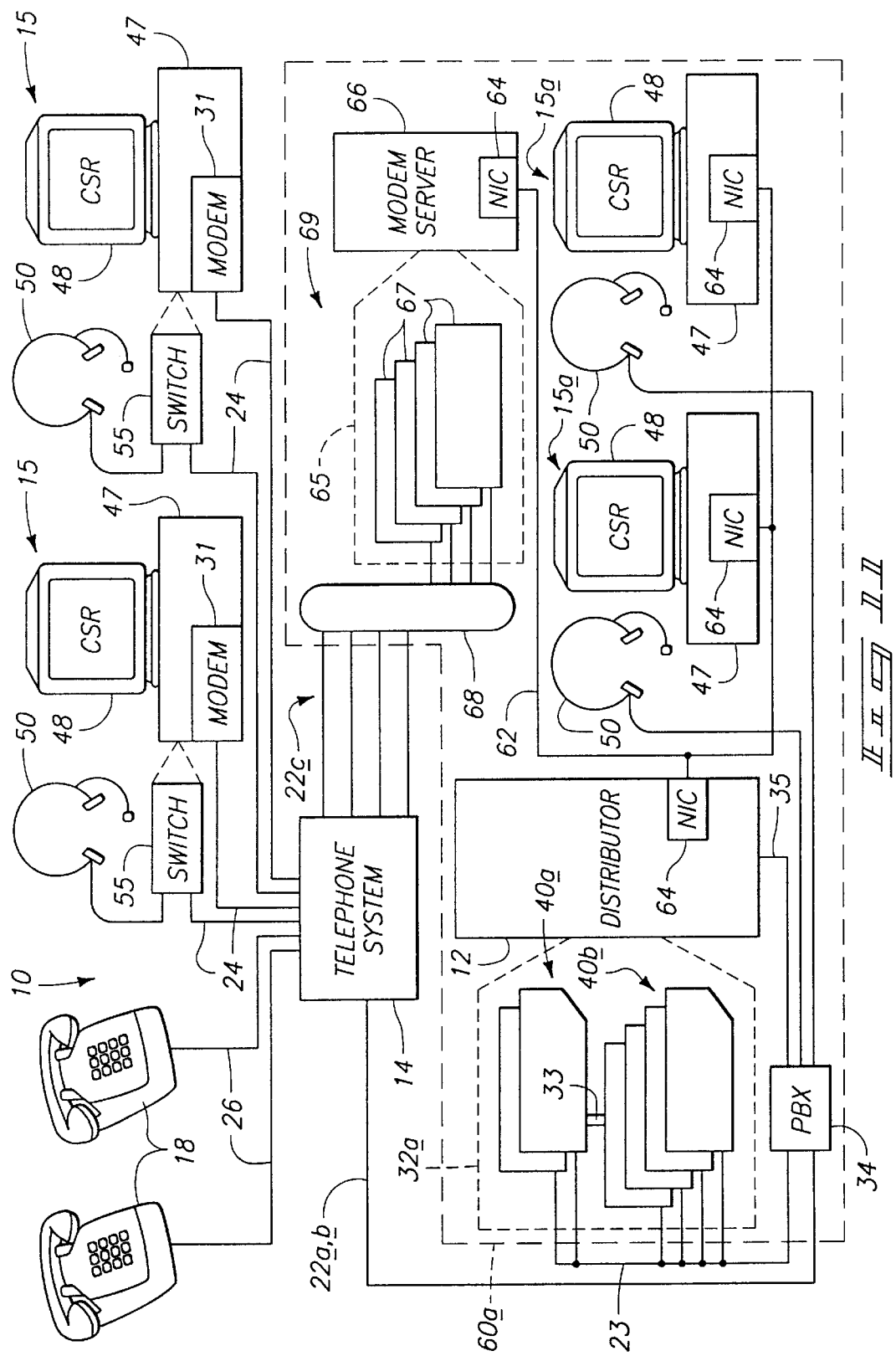
FIG. 11 is a schematic diagram corresponding to the embodiment of the distributed network of FIG. 10.

Referring to FIG. 11, an embodiment of distributed network 10 corresponding to FIG. 10 is illustrated. The presently described distributed network system 10 is configured to provide communication of associated data from distributor 12 to remote CSR terminals 15 via packet switched network 69. Voice communications are provided intermediate distributor 12 and remote CSR terminals 15 through standard voice connections of telephone system 14 utilizing telephony resources 32a of distributor 12. Further, data communication and voice communications are separately communicated within call center 60a in the embodiment illustrated in FIG. 11.

An individual customer can forward a voice communication via a customer terminal 18 and connection 26. The voice communication is received within telephone system 14 and applied via connection 22a to a branch exchange 34 within call center 60a. Connections 22 preferably comprise T-1 connections in the described embodiment.

Branch exchange 34 comprises a private branch exchange (PBX) in one embodiment. A suitable branch exchange 34 has designation Meridian I and is available from Northern Telecom Limited. Inbound voice communications are received within PBX 34. Thereafter, PBX directs the voice communication to telephony resources, 32a.

The depicted telephony resources 32a comprise a first bank of telephony boards 40a and a second bank of telephony boards 40b. The first bank of telephony boards 40a is configured for communications with client terminals (not shown in FIG. 11). The second bank of telephony boards 40b is configured for voice communications with customer terminals 18 and remote CSR terminals 15. The depicted telephony resources 32a include an SC bus 33 or MVIP interface coupled intermediate telephony boards 40.

Distributor 12 determines an appropriate CSR to handle the inbound or outbound voice communication. Following identification of the CSR, the voice communication is routed to the terminal of the appropriate CSR.

Data communications with remote CSR terminals 15 are provided via network interface cards 64, local area network 62, modem server 66, interface 68, connections 22c and telephone system 14 using packet switched network 69. Distributor 12 can include Internet service provider (ISP) software as previously described for providing data transfer intermediate distributor 12 and remote CSR terminals 15 via packet switched network 69.

It is preferred to provide the associated data to the CSR prior to establishing the voice communication. Associated data is applied via an appropriate connection 24 to modem 31 of a remote CSR terminal 15. Exemplary modems 31 comprise AT&T DataPort® 2001 modems. Associated data may be displayed, upon monitor 48 of the appropriate remote CSR terminal 15.

In one embodiment, a switch 55 is provided to establish a voice communication channel intermediate telephone system 14 and audio/voice interface 50 responsive to data being received within the respective remote CSR terminal 15 via modem 31. Switch 55 comprises a D/2H board available from Dialogic Corporation in one embodiment.

For remote CSR communications, the voice communications are directed from branch exchange 34 to telephone system 14. A CTI connect control bus 35 is provided intermediate distributor 12 and branch exchange 34. Bus 35 is configured to communicate control signals to branch exchange 34 to control the routing of the voice communications. Bus 35 can be configured to use CT-Connect resource management software available from Dialogic Corporation.

Branch exchange 34 routes the communication via telephone system 14 to switch 55 of an appropriate CSR terminal 15. The voice is applied to the corresponding interface 50 after the corresponding data has been received by modem 31 within CSR terminal 15 in one embodiment.

For in-house communications, associated data regarding the communication is forwarded via network interface cards 64 and local area network 62 to call center CSR terminals 15a. The associated data, is viewable using monitors 48 of in-house CSR terminals 15a. Following reception of the data within one of the in-house CSR terminals 15a, the voice communication can be applied from the branch exchange 34 to the interface 50 of an is appropriate in-house CSR terminal 15a responsive to control signals from distributor 12.

Referring to FIG. 12, another embodiment of distributed network system 10 is illustrated. The depicted distributed network system 10 is configured in an arrangement similar to distributed network system 10 of FIG. 11. The system 10 depicted in FIG. 12 is configured to provide voice and data communications with remote CSR terminals 15 as described with reference to FIG. 11. Data communications within call center 60b are provided via local area network 62 intermediate in-house CSR terminals 15a and distributor 12 as described with reference to FIG. 11.

The depicted call center 60b includes a modular station interface (MSI) card 36. Voice communications to be routed within call center 60b are provided using modular station interface card 36. A suitable modular interface card 36 comprises a MSI/240SC available from Dialogic Corporation. Modular station interface card 36 provides communications intermediate telephony resources 32a and selected audio/voice interfaces 50 of respective in-house CSR terminals 15a responsive to control and selection of distributor 12.

Referring to FIG. 13, distributed network 10 is configured to provide forwarding of data and voice communications among customer service representatives and other parties such as clients third party customer service representatives, and supervisors. An individual can input an inbound communication via customer terminal 18 through telephone system 14 to distributor 12 as previously described. Alternatively, distributor 12 can connect or place an outbound communication. Utilizing a database upon hard drive 44, distributor 12 can identify a first customer service representative 19 utilizing a corresponding CSR terminal 15.

A voice communication between customer terminal 18 and the first customer service representative 19 is established following forwarding of associated data from distributor 12 to CSR terminal 15 and receipt of the associated data within the selected CSR terminal 15. During duplexed communications intermediate first customer service representative 19 and a customer using terminal 18, it may be desired to forward communications or include an additional party or parties within the communications.

In particular, associated data regarding the individual using customer terminal 18 is forwarded to a second customer service representative (also referred to as a third party CSR) 21 using another CSR terminal 15 via telephone system 14 and distributor 12. In one embodiment, distributor 12 selects an appropriate third party or other customer service representative 21 responsive to input from the individual using customer terminal 18. In other embodiments, first CSR 19 can initiate the call forwarding process. Either representative 19, 21 can it be in-house or remote, or both.

Following application of associated data regarding the customer to CSR terminal 15 of customer service representative 21, voice communications can be established between customer service representative 21 and the individual using customer terminal 18 in accordance with the preferred embodiment Previous customer service representative 19 can thereafter remain within the conversation between customer service representative or third party 21 and the customer using terminal 18 or be excluded from the conversation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A system configured to distribute a telephone call within a network, the system comprising:
    a distributor adapted to couple with a telephone system, the distributor being configured to connect a telephone call using the telephone system and output the telephone call and associated data of the telephone call;
    a plurality of customer service representative terminals connected with the distributor and a selected customer service representative terminal being configured to receive the telephone call and the associated data; and
    wherein the distributor is configured to output the telephone call subsequent to outputting the associated data.

2. The system according to claim 1 wherein the distributor is configured to output the telephone call and the associated data to the telephone system.

3. The system according to claim 2 wherein the selected customer service representative terminal is adapted to connect with the telephone system and receive the telephone call and associated data from the telephone system.

4. The system according to claim 1 wherein the distributor is configured to chose the selected customer service representative terminal responsive to the associated data.

5. The system according to claim 1 wherein the associated data is accessed responsive to automatic caller identification information.

6. The system according to claim 1 wherein the associated data is accessed responsive to dialed number identification service information.

7. The system according to claim 1 wherein the distributor is configured to at least one of receive an inbound call and place an outbound call to connect the telephone call.

8. The system according to claim 1 wherein the distributor and some of the customer service representative terminals are implemented within a call center.

9. The system according to claim 1 further comprising plural simultaneous voice and data devices configured to couple the distributor and the customer service representative terminals.

10. A communication system comprising:
    a distributor configured to connect a communication, and output the communication and associated data corresponding to the communication;
    media configured to connect with the distributor and transport the communication and the associated data;
    a plurality of terminals individually configured to connect with the media and receive the communication and the associated data, and wherein the distributor is configured to direct the communication to a selected one of the plural terminals responsive to the associated data; and
    wherein the distributor is configured to direct the communication to the terminal responsive to the associated data being received within the terminal.

11. The system according to claim 10 wherein the distributor is configured to select one of the terminals responsive to the associated data.

12. The system according to claim 10 wherein the distributor and the terminal are implemented within a call center.

13. The system according to claim 10 wherein the communication corresponds to a voice communication of an individual.

14. The system according to claim 13 wherein the distributor is configured to determine the associated data responsive to input from the individual.

15. The system according to claim 10 wherein the distributor is configured to determine the associated data responsive to identification data corresponding to the communication.

16. The system according to claim 11 wherein the media comprises a telephone system configured to transport the communication, and a packet switched network configured to transport the associated data using the telephone system.

17. The system according to claim 16 wherein the telephone system comprises a PSTN network.

18. The system according to claim 10 wherein the media is configured to transport the communication and the associated data over a single communication line.

19. The system according to claim 10 wherein the media includes plural simultaneous voice and data devices.

20. A communication system comprising:
  a distributor configured to connect a communication and output the communication and associated data corresponding to the communication; and
  a terminal connected with the distributor and configured to receive the communication and the associated data, the distributor and terminal being configured to synchronize application of the communication and associated data from the distributor to the terminal.

21. The system according to claim 20 further comprising plural terminals coupled with the distributor.

22. The system according to claim 21 wherein the distributor is configured to direct the communication to a selected one of the plural terminals responsive to the associated data.

23. The system according to claim 20 wherein the distributor is configured to direct the communication to the terminal responsive to the associated data being received within the terminal.

24. The system according to claim 20 wherein the terminal is configured to output an indication signal responsive to receiving the associated data, and the distributor is configured to output the communication responsive to receiving the indication signal.

25. The system according to claim 20 wherein the distributor is configured to determine the associated data.

26. The system according to claim 20 further comprising a telephone system configured to transport the communication intermediate the distributor and the terminal and a packet switched network configured to transport the associated data intermediate the distributor and the terminal.

27. The system according to claim 26 wherein the telephone system comprises a PSTN network.

28. The system according to claim 20 further comprising plural simultaneous voice and data devices configured to couple the distributor and the terminal.

29. The system according to claim 28, wherein the distributor is configured to place an outbound communication to connect the call.

30. A system configured to distribute a telephone call, the system comprising:
  a plurality of terminals configured to receive a telephone call and associated data corresponding to the telephone call;
  a communication server configured to receive the telephone call from an individual and provide associated data regarding the telephone call responsive to one of input from the individual and identification data corresponding to the telephone call, the communication server being configured to select one of the terminals responsive to the associated data and output the associated data and the telephone call to the selected terminal;
  the communication server and selected terminal being configured to synchronize the transmission of the associated data and telephone call from the communication server to the selected terminal with the communication server being configured to output the associated data to the selected terminal, the selected terminal being configured to output an indication signal to the communication server responsive to reception of the associated data, the communication server being configured to output the telephone call responsive to reception of the indication signal; and
  a simultaneous voice and data device configured to simultaneously transport the telephone call and the associated data via a single communication line intermediate the communication server and the selected terminal.

31. A communication method comprising:
  connecting a communication with a distributor;
  providing associated data corresponding to the communication;
  forwarding the associated data to a terminal;
  forwarding the communication to the terminal; and
  synchronizing the forwarding the associated data and the forwarding the communication using the distributor and the terminal.

32. The communication method according to claim 31 further comprising distributing the communication to one of a plurality of terminals.

33. The communication method according to claim 32 further comprising selecting the one terminal responsive to the providing the associated data.

34. The communication method according to claim 32 further comprising forwarding the associated data and the communication to another terminal.

35. The communication method according to claim 32 further comprising establishing duplexed communications using the terminal and the distributor.

36. The communication method according to claim 32 wherein the providing comprises receiving associated data with the communication.

37. The communication method according to claim 32 wherein the providing comprises generating associated data responsive to the communication.

38. The communication method according to claim 32 wherein the forwarding the associated data comprises forwarding using a packet switched network.

39. The communication method according to claim 32 wherein the forwarding the communication comprises forwarding using a telephone system.

40. The communication method according to claim 32 wherein the forwardings comprise using a simultaneous voice and data device.

41. The communication method according to claim 32 wherein the connecting comprises one of receiving an inbound communication and connecting an outbound communication.

42. A method of routing a telephone call to a customer service representative comprising:
  connecting a telephone call of a caller;
  providing associated data identifying the caller;
  selecting a customer service representative in response to the identified caller;
  opening a communications channel with the selected customer service representative;
  transferring the associated data identifying the caller to the customer service representative; and
  connecting the caller with the selected customer service representative after the selected customer service representative receives the associated data identifying the caller.

43. The method according to claim 42 wherein the providing the associated data is responsive to automatic number identification information.

44. The method according to claim 42 wherein the providing the associated data is responsive to dialed number identification service information.

45. The method according to claim 42 wherein the connecting comprises establishing duplexed communications.

46. The method according to claim 42 wherein the connecting the caller comprises using a packet switched network.

47. The method according to claim 42 wherein the connecting the caller comprises using a telephone system.

48. The method according to claim 42 wherein the connecting the caller comprises using a simultaneous voice and data device.

49. The method according to claim 42 wherein the connecting the telephone call comprises one of receiving an inbound communication and connecting an outbound communication.

50. The system according to claim 1 wherein the associated data corresponds to an individual placing the telephone call, and the distributor is configured to select the selected customer service terminal responsive to the associated data and corresponding to the individual.

51. The system according to claim 22 wherein the associated data corresponds to an individual placing the telephone call, and the distributor is configured to select the one terminal responsive to the associated data and corresponding to the individual.

52. The communication method according to claim 33 wherein the providing associated data comprises providing associated data corresponding to an individual placing the communication, and the selecting comprises selecting responsive to the providing the associated data and corresponding to the individual.

53. The communication method according to claim 31 wherein the synchronizing includes forwarding the communication to the terminal after the forwarding the associated data to the terminal.

54. The communication method according to claim 34 wherein the forwarding the communication is responsive to the reception of the associated data within the terminal.

* * * * *